US006879894B1

(12) United States Patent
Lightner et al.

(10) Patent No.: US 6,879,894 B1
(45) Date of Patent: Apr. 12, 2005

(54) INTERNET-BASED EMISSIONS TEST FOR VEHICLES

(75) Inventors: Bruce Lightner, La Jolla, CA (US); Matthew J. Banet, Del Mar, CA (US); Diego Borrego, San Diego, CA (US); Larkin Hill Lowrey, La Jolla, CA (US); Chuck Myers, La Jolla, CA (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 103 days.

(21) Appl. No.: 09/908,440

(22) Filed: Jul. 18, 2001

Related U.S. Application Data

(60) Provisional application No. 60/287,397, filed on Apr. 30, 2001.

(51) Int. Cl.[7] ........................ G06F 19/00; G01M 15/00
(52) U.S. Cl. ........................................... 701/33; 701/29
(58) Field of Search ..................................... 701/29, 33

(56) References Cited

U.S. PATENT DOCUMENTS

| | | | | | |
|---|---|---|---|---|---|
| 5,442,553 | A | | 8/1995 | Parrillo | 455/420 |
| 5,479,479 | A | | 12/1995 | Braitberg et al. | 455/404.1 |
| 5,574,427 | A | | 11/1996 | Cavallaro | 340/436 |
| 5,671,141 | A | * | 9/1997 | Smith et al. | 701/29 |
| 5,732,074 | A | | 3/1998 | Spaur et al. | 370/313 |
| 5,758,300 | A | | 5/1998 | Abe | 455/424 |
| 5,781,871 | A | * | 7/1998 | Mezger et al. | 455/424 |
| 5,797,134 | A | | 8/1998 | McMillan et al. | 705/400 |
| 6,064,970 | A | | 5/2000 | McMillan et al. | 705/4 |
| 6,263,268 | B1 | * | 7/2001 | Nathanson | 701/29 |
| 6,295,492 | B1 | | 9/2001 | Lang et al. | 701/33 |
| 6,429,773 | B1 | * | 8/2002 | Schuyler | 340/425.5 |
| 6,487,717 | B1 | * | 11/2002 | Brunemann et al. | 717/173 |
| 6,505,106 | B1 | * | 1/2003 | Lawrence et al. | 701/35 |

FOREIGN PATENT DOCUMENTS

| | | | |
|---|---|---|---|
| WO | WO 00/40038 | * | 7/2000 |
| WO | WO 00/79727 | | 12/2000 |

* cited by examiner

*Primary Examiner*—Michael J. Zanelli
(74) *Attorney, Agent, or Firm*—Wilmer Cutler Pickering Hale and Dorr LLP

(57) ABSTRACT

The invention provides a method and device for characterizing a vehicle's emissions. These systems feature the steps of generating a data set from the vehicle that includes at least one of the following: diagnostic trouble codes, status of a MIL, and data relating to I/M readiness flags; and then transferring the data set to a wireless appliance that features a microprocessor and a wireless transmitter in electrical contact with the microprocessor. The wireless appliance then transmits a data packet comprising the data set (or a version of the data set) with the wireless transmitter over an airlink to a wireless communications system. Here, 'a version of the data set' means a representation (e.g., a binary representation) of data in the data set, or data calculated or related to data in the data set.

44 Claims, 9 Drawing Sheets

30

| TIME/DATE | SUPPORTED TESTS | STATUS |
|---|---|---|
| 3/17/01 21:23 | MISFIRE MONITORING | COMPLETE |
| | FUEL SYSTEM MONITORING | COMPLETE |
| | COMPREHENSIVE COMPONENT MONITORING | COMPLETE |
| | CATALYST MONITORING | COMPLETE |
| | EVAPORATION SYSTEM MONITORING | COMPLETE |
| | OXYGEN SENSOR MONITORING | COMPLETE |
| | OXYGEN SENSOR HEATER MONITORING | COMPLETE |
| 3/18/01 12:25 | EGR SYSTEM MONITORING | COMPLETE |

32 34 36

FIG. 3

| | TIME/DATE | SUPPORTED TESTS | STATUS | ODO. (MILES) | STATE |
|---|---|---|---|---|---|
| 150 | 3/17/01 21:23 | | | 0 | A |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | COMPLETE | | |
| | | EVAPORATIVE SYSTEM MONITORING | COMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |
| 152 | 3/18/01 12:25 | | | 1 | B |
| | | MISFIRE MONITORING | INCOMPLETE | | |
| | | FUEL SYSTEMS MONITORING | INCOMPLETE | | |
| | | COMPREHENSIVE COMPONENT MONITORING | INCOMPLETE | | |
| | | CATALYST MONITORING | INCOMPLETE | | |
| | | EVAPORATIVE SYSTEM MONITORING | INCOMPLETE | | |
| | | OXYGEN SENSOR MONITORING | INCOMPLETE | | |
| | | OXYGEN SENSOR HEATER MONITORING | INCOMPLETE | | |
| | | EGR SYSTEM MONITORING | INCOMPLETE | | |
| 154 | 3/18/01 12:47 | | | 22 | C |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | INCOMPLETE | | |
| | | EVAPORATIVE SYSTEM MONITORING | INCOMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |
| 156 | 3/18/01 13:17 | | | 54 | D |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | INCOMPLETE | | |
| | | EVAPORATIVE SYSTEM MONITORING | COMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |

(A) SEE FIG. 7B

FIG. 7A (A) SEE FIG. 7A

| | TIME/DATE | SUPPORTED TESTS | STATUS | ODO. (MILES) | STATE |
|---|---|---|---|---|---|
| 158 | 3/18/01 13:28 | | | 65 | D |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | INCOMPLETE | | |
| | | EVAPORATIVE SYSTEM MONITORING | COMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |
| 160 | 3/19/01 19:55 | | | 231 | D |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | INCOMPLETE | | |
| | | EVAPORATIVE SYSTEM MONITORING | COMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |
| 162 | 3/20/01 6:23 | | | 244 | A |
| | | MISFIRE MONITORING | COMPLETE | | |
| | | FUEL SYSTEMS MONITORING | COMPLETE | | |
| | | COMPREHENSIVE COMPONENT MONITORING | COMPLETE | | |
| | | CATALYST MONITORING | INCOMPLETE | | |
| | | EVAPORATIVE SYSTEM MONITORING | INCOMPLETE | | |
| | | OXYGEN SENSOR MONITORING | COMPLETE | | |
| | | OXYGEN SENSOR HEATER MONITORING | COMPLETE | | |
| | | EGR SYSTEM MONITORING | COMPLETE | | |

FIG. 7B

INTERNET-BASED EMISSIONS TEST FOR VEHICLES

This application claims the benefit of U.S. Provisional Application No. 60/287,397, filed Apr. 30, 2001.

FIELD OF THE INVENTION

The present invention relates to use of an internet-based system for diagnosing a vehicle's emissions.

BACKGROUND OF THE INVENTION

The Environmental Protection Agency (EPA) requires vehicle manufacturers to install on-board diagnostics (OBD-II systems) for monitoring light-duty automobiles and trucks beginning with model year 1996. OBD-II systems (e.g., microcontrollers and sensors) monitor the vehicle's electrical, mechanical, and emissions systems and generate data that are processed by a vehicle's engine control unit (ECU) to detect malfunctions or deterioration in the vehicle's performance. Most ECUs transmit status and diagnostic information over a shared, standardized electronic buss in the vehicle. The buss effectively functions as an on-board computer network with many processors, each of which transmits and receives data. Sensors that monitor the vehicle's engine functions (e.g., the cruise-control module, spark controller, exhaust/gas recirculator) and power train (e.g., its engine, transmission, and braking systems) generate data that pass across the buss. Such data are typically stored in memory in the ECU and include parameters such as vehicle speed, fuel level, engine temperature, and intake manifold pressure. In addition, in response to these data, the EC) generates 5-digit 'diagnostic trouble codes' (DTCs) that indicate a specific problem with the vehicle. The presence of a DTC in the memory of a vehicle's ECU can result in illumination of the 'Malfunction Indicator Light' (MIL) present on the dashboard of most vehicles. When the MIL is lit a corresponding datum on the ECU is stored with a value of '1', while an unlit MIL has a corresponding datum of '0'.

The above-mentioned data are made available through a standardized, serial 16-cavity connector referred to herein as an 'OBD-II connector'. The OBD-II connector is in electrical communication with the ECU and typically lies underneath the vehicle's dashboard.

The EPA has also recommended that inspection and maintenance (I/M) readiness tests conducted using the OBD-II connector be used to diagnose a vehicle's emissions performance. I/M readiness tests monitor the status of up to 11 emissions control-related subsystems in a vehicle. The ECU monitors first three subsystems—misfire, fuel trim, and comprehensive subsystems—continuously. The remaining eight subsystems—catalyst, evaporative system, oxygen sensor, heated oxygen sensor, exhaust gas recirculation (EGR), air conditioning, secondary air, and heated catalyst subsystems—are run after a predetermined set of conditions are met. Not all subsystems (particularly the air conditioning, secondary air, and heated catalyst subsystems) are necessarily present on all vehicles.

I/M readiness tests generate a 'flag' describing their status. The flag can appear as either 'complete' (meaning that the test in question has been successfully completed), 'incomplete' (meaning that the test has not been successfully completed), or 'not applicable' (meaning that the vehicle is not equipped with the subsystem in question).

Current federal regulations for I/M readiness testing are described in 40 CFR Parts 51 and 85, the contents of which are incorporated herein by reference. In general, these regulations require that a vehicle manufactured during or after model year 2001 having an I/M readiness flag of 'incomplete' does not 'pass' the emissions test. Other vehicles that do not 'pass' the test include those manufactured between model years 1996 and 2000 with more than two 'incomplete' readiness flags, and those manufactured in model year 2000 with more than one 'incomplete' flag. In addition, the regulations require that any vehicle that includes a DTC that lights its MIL does not 'pass' the test. A vehicle with a malfunctioning MIL (e.g., a MIL that includes a burnt-out bulb) also does not 'pass' the test.

During existing I/M inspections, data from the vehicle's ECU is typically queried using an external engine-diagnostic tool (commonly called a 'scan tool') that plugs into the OBD-II connector. The vehicle's engine is turned on and data are transferred from the ECU, through the OBD-II connector, and to the scan tool. The scan tool then displays and analyzes the data to monitor the vehicle. Scan tools are typically only used to diagnose stationary vehicles or vehicles running on a dynamometer.

BRIEF SUMMARY OF THE INVENTION

It is an object of the present invention to provide a wireless, internet-based system for monitoring a vehicle's emissions performance using an I/M readiness test. Specifically, it is an object of the invention to access data from a vehicle while it is in use, transmit it wirelessly through a network and to a website, analyze the data according to EPA-mandated (or equivalent) procedures; and then continuously repeat this process if the vehicle's emissions are non-compliant. This means that a vehicle's emission performance can be analyzed accurately and in real-time without having to take the vehicle into an emissions-checking station. A vehicle can be monitored continuously, and its owner notified the moment it becomes non-compliant. Data are accessed through the same OBD-II connector used by conventional scan tools. The invention also provides an Internet-based web site to view these data. The web site also includes functionality to enhance the data being collected, e.g. it can be used to collect a different type of diagnostic data or the frequency at which the data are collected. The data include, for example, DTCs, status of the MIL, and I/M readiness flags.

In one aspect, the invention provides a method and device for characterizing a vehicle's emissions. The method features the steps of first generating a data set from the vehicle that includes DTCs, status of a MIL, and data relating to at least one I/M readiness flag, and then transferring the data set to a wireless appliance. The wireless appliance includes i) a microprocessor, and ii) a wireless transmitter in electrical contact with the microprocessor. The wireless transmitter transmits a data packet comprising the data set or a version thereof over an airlink to a host computer system, which then analyzes it to determine a status of the vehicle's emissions. The generating, transferring, transmitting, and analyzing steps are repeated while the vehicle is in use to determine an updated status of the vehicle's emissions. The method also includes sending a communication (e.g., an email) describing the vehicle's emissions status to, e.g., the vehicle's owner.

In embodiments, the generating, transferring, transmitting, and analyzing steps are repeated to determine when the vehicle's emissions are either compliant or no longer compliant with a pre-determined emissions-related criteria. In this case the communication indicates the vehicle's status. These steps can also be used to monitor data relating to at least one I/M readiness flag. The steps are stopped when all readiness flags are registered as 'complete' or an equivalent thereof. Here, 'equivalent thereof' means other language or wording or a numerical representation can be used to indicate that the flag is 'complete'. In addition to the email described above, the sending step can involve using a computer to send out an email or make a phone call. Alternatively, it involves sending an electronic text, data, or voice message to a computer, cellular telephone, or wireless device.

The method includes processing the data packet with the host computer system to retrieve the data set or a version thereof. In this case a 'version thereof' means a representation (e.g. a binary or encrypted representation) of data in the data set that may not be exactly equivalent to the original data retrieved from the ECU. The data set or portions thereof are typically stored in a database comprised by the host computer system.

The analysis step typically includes the following steps: a) determining if one or more DTCs are present in the data set; b) determining a status of the MIL; and c) determining a status of the I/M readiness tests. It is ultimately used to determine if a user 'passes' or 'does not pass' an emissions test. Determining the status of the I/M readiness flag more specifically includes determining a status of at least one of the following I/M readiness tests if they are supported by the vehicle: i) misfire monitoring; ii) fuel systems monitoring; iii) comprehensive component monitoring; iv) catalyst monitoring; v) evaporative system monitoring; vi) oxygen sensor monitoring; vii) oxygen sensor heater monitoring; viii) exhaust gas recirculator system monitoring. The statuses of each of these tests is characterized by 'complete', 'incomplete', 'not available', 'not supported' or equivalents thereof.

A vehicle (specifically a vehicle manufactured between model year 1996 and 2000) is determined to not 'pass' an emissions test if more than 2 of the I/M readiness flags are 'incomplete'. In embodiments, a vehicle does not 'pass' an emissions test if the MIL status is 'on' or an equivalent thereof, or if one or more DTCs is present in the data. In other embodiments, a vehicle only does not pass the test if both the MIL status is 'on' and one or more DTCs are present. In other embodiments, a user 'passes' an emissions test if the MIL status is 'off' or an equivalent thereof and either 0, 1, or 2 of supported I/M readiness flags are 'incomplete' or an equivalent thereof. Here, 'an equivalent thereof' means any other way of representing the terms 'off' and 'incomplete' as used above.

The method can also include the step of displaying the data set or results of the emissions test on a web site. The data set described above is monitored from a vehicle's engine computer, typically with a monitoring period of 24 hours or less. The monitoring typically ceases when the data relating to the I/M readiness flags indicates that no more than two flags supported in the vehicle are 'incomplete' or an equivalent thereof. Alternatively, the monitoring ceases when the data relating to the I/M readiness flags indicates that each flag supported in the vehicle is 'complete' or an equivalent thereof. The transferring step typically includes serially transferring the data set through an OBD-II connector or equivalent thereof (e.g., an equivalent serial port) in the vehicle to the wireless appliance.

The wireless network can be a data network such Cingular's Mobitex network or Skytel's Reflex network, or a conventional voice or cellular network. The wireless appliance operates in a 2-way mode, i.e. it can both send and receive data. For example, it can receive data that modifies the frequencies at which it sends out data packets or queries the ECU. Such a wireless appliance is described in the application WIRELESS DIAGNOSTIC SYSTEM FOR VEHICLES, U.S. Ser. No. 09/776,106, filed Feb. 1, 2001, the contents of which are incorporated herein by reference.

In the above-described method, the term "airlink" refers to a standard wireless connection (e.g., a connection used for wireless telephones or pagers) between a transmitter and a receiver. This term describes the connection between the wireless transmitter and the wireless network that supports data transmitted by this component. Also in the above-described met hod, the 'generating' and 'transmitting' steps can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses may require the steps to be performed only once each year or after a large number of miles are driven. Alternatively, the vehicle may be configured to automatically perform these steps at predetermined or random time intervals. As described in detail below, the transmission frequency can be changed in real time by downloading a new 'schema' to the wireless appliance through the wireless network. The term 'email' as used herein refers to conventional electronic mail messages sent over the Internet.

The term 'web page' refers to a standard, single graphical user interface or 'page' that is hosted on the Internet or worldwide web. A 'web site' typically includes multiple web pages, many of which are 'linked' together, that are accessed through a series of 'mouse clicks'. Web pages typically include: 1) a 'graphical' component for displaying a user interface (typically written in a computer language called 'HTML' or hypertext mark-up language); an 'application' component that produces functional application s, e.g. sorting and customer registration, for the graphical functions on the page (typically written in, e.g., C++ or java); and a database component that accesses a relational database (typically written in a database-specific language, e.g. SQL*Plus for Oracle databases).

The invention has many advantages. In particular, wireless transmission of I/M readiness flags, MIL status, and DTC-related data from a vehicle, followed by analysis and display of these data using a web site hosted on the internet, makes it possible to perform EPA-recommend ed emissions tests in real-time from virtually any location that has internet access, provided the vehicle being tested includes the above-described wireless appliance. This ultimately means the emissions-related problems with the vehicle can be quickly and efficiently diagnosed. When used to continuously monitor vehicles, the above-mentioned system can be used to notify the vehicle's owner precisely when the vehicle no longer passes the emissions test. In this way polluting vehicles are identified and rapidly repaired, thereby help ing the environment.

An internet-based system for performing I/M-based emissions tests can also be easily updated and made available to a large group of users simply by updating software on the web site. In this way anyone with an Internet connection can use the updated software. In contrast, a comparable updating process for a series of scan tools can only be accomplished by updating the software on each individual scan tool. This, of course, is time-consuming, inefficient, and expensive, and introduces the possibility that particular scan tools may not have the very latest software.

The wireless appliance used to access and transmit the vehicle's data is small, low-cost, and can be easily installed in nearly every vehicle with an OBD-II connector in a matter of minutes. It can also be easily transferred from one vehicle to another, or easily replaced if it malfunctions.

The resulting data, of course, have many uses for the EPA, California Air Resources Board (CARB), insurance organizations, and other organizations concerned with vehicle emissions and the environment.

These and other advantages of the invention are described in the following detailed disclosure and in the claims.

BRIEF DESCRIPTION OF DRAWINGS

The features and advantages of the present invention can be understood by reference to the following detailed description taken with the drawings, in which:

FIG. 3 is a table that shows a status of eight readiness flags supported by a vehicle;

FIG. 7 is a table that shows a time-dependent status of eight readiness flags supported by a vehicle before and after a DTC is generated.

DESCRIPTION OF THE PREFERRED EMBODIMENTS

Figure 1:
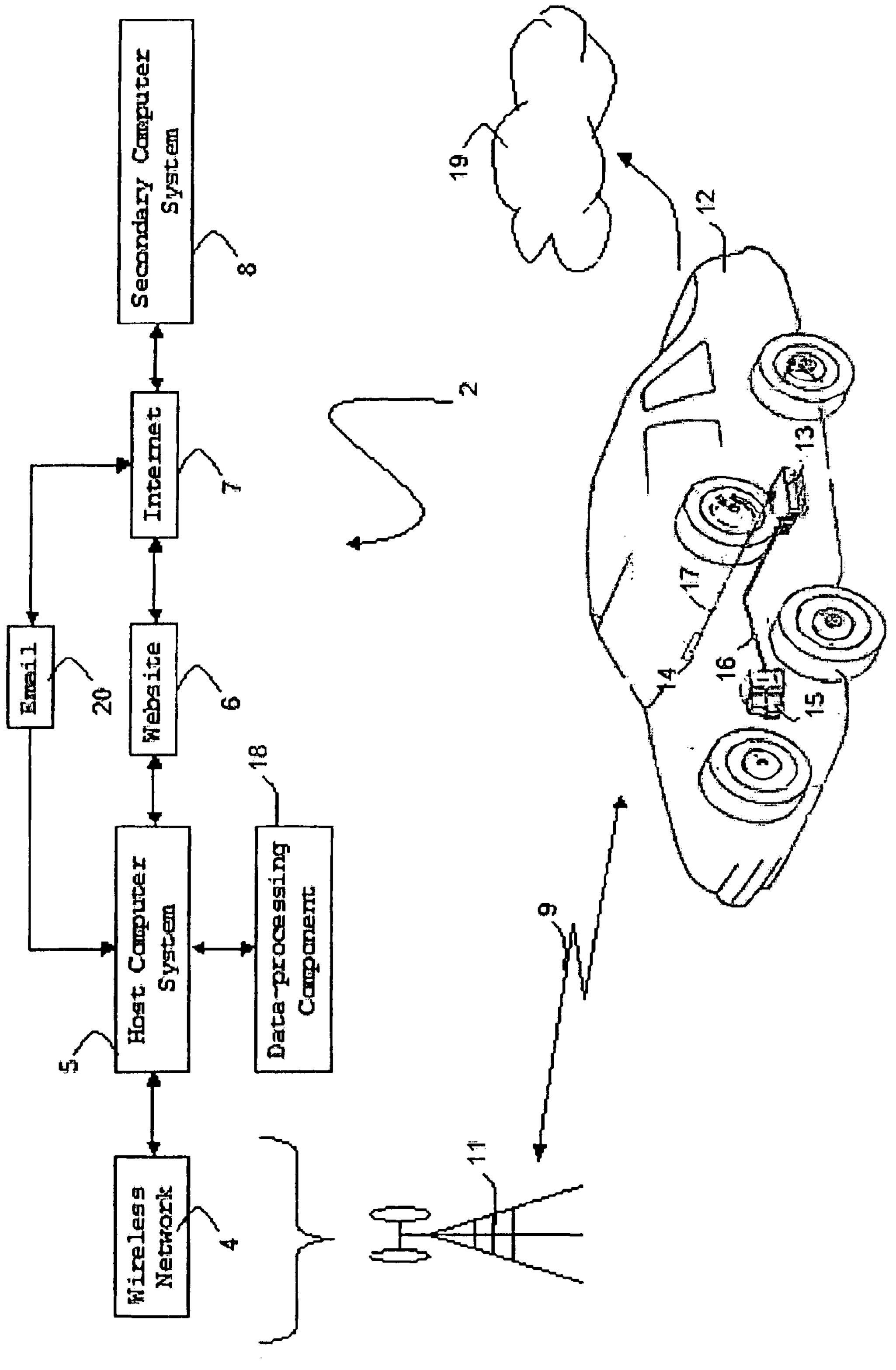
FIG. 1 is a schematic drawing of a system for performing a wireless, I/M-based emissions test featuring a vehicle transmitting data across an airlink to an Internet-accessible host computer system.

FIG. 1 shows a schematic drawing of an Internet-based system 2 that performs a wireless IM-based emissions test for a vehicle 12. The system 2 measures diagnostic data that includes I/M readiness flags, MIL status, and current DTCs from the vehicle 12. A wireless appliance 13 in the vehicle 12 transmits these data in a data packet over an airlink 9. As described in more detail below, the data packet propagates through a wire less network 4 to a web site 6 hosted by a host computer system 5. A user accesses the web site 6 with secondary computer system 8 through the Internet 7. The host computer system 5 also features a data-processing component 18 that analyzes the I/M readiness flags, MIL status, and current DTCs as described below to predict if the vehicle's emissions 19 comply with a predetermined level or amount.

If the user 'passes' the emissions test, as described in more detail below, the host computer system 5 sends out an email 20 notifying the user of the 'pass' results. In particular, the vehicle can be continuously monitored by the system, and the email indicating the 'pass' result can be sent out periodically. Alternatively, the system can continuously monitor the vehicle and determine the exact moment at which the vehicle 'fails' the emissions test. In either case, the email 20 propagates through the Internet 7 to the secondary computer system 8, where a user (and possibly a regulatory office, such as the EPA or a local Department of Motor Vehicles) receives it. This ultimately increases the chance that a polluting vehicle is quickly brought in for service, thereby helping the environment and improving the vehicle's performance.

The wireless appliance 13 disposed within the vehicle 12 collects diagnostic data from the vehicle's engine computer 15. In response to a query, the engine computer 15 retrieves data stored in its memory and sends it along a cable 16 to the wireless appliance 13. The appliance 13 typically connects to the OBD-II connector located under the vehicle's dashboard. This connector is mandated by the EPA and is present in nearly all vehicles manufactured after 1996. The wireless appliance 13 includes a data-collection component (not shown in the figure) that formats the data in a packet and then passes the packet to a wireless transmitter (also not shown in the figure)., which sends it through a cable 17 to an antenna 14. For example, the data-collection component is a circuit board that interfaces to the vehicle's engine computer 16 through the vehicle's OBD-II connector, and the wireless transmitter is a radio modem. To generate the I/M readiness flags, MIL status, and current DTCS, the wireless appliance 13 queries the vehicle's engine computer 15 with a first time interval (e.g. every 20 seconds) to retrieve the data, and transmits the data packet with a longer time interval (e.g. every 10 minutes) so that it can be analyzed by the data-processing component 18. A data-collection 'schema', described in more detail in the application titled INTERNET-BASED VEHICLE-DIAGNOSTIC SYSTEM, U.S. Ser. No. 09/808,690, filed Mar. 14, 2001, the contents of which are incorporated herein by reference, specifies these time intervals and the data that are collected.

The antenna 14 typically rests in the vehicle's shade band, disposed just above the dashboard, and radiates the data packet over the airlink 9 to a base station 11 included in the wireless network 4. The host computer system 5 connects to the wireless network 4 and receives the data packets. The host computer system 5, for example, may include multiple computers, software pieces, and other signal-processing and switching equipment, such as routers and digital signal processors. Data are typically transferred from the wireless network 4 to host computer system 5 through a TCP/IP-based connection, or with a dedicated digital leased line (e.g., a frame-relay circuit or a digital line running an X.25 protocol). The host computer system 5 also hosts the web site 6 using conventional computer hardware (e.g. computer servers for a database and the web site) and software (e.g., web server and database software). A user accesses the web site 6 through the Internet 7 from the secondary computer system 8. The secondary computer system 8, for example, may be located in an automotive service center that performs conventional emissions tests using a scan tool.

The wireless appliance that provides diagnostic data to the web site is described in more detail in WIRELESS DIAGNOSTIC SYSTEM FOR VEHICLES, filed Feb. 1, 2001, the contents of which have been previously incorporated by reference. The appliance transmits a data packet that contains information describing its status, an address describing its destination, an address describing its origin, and a 'payload' that contains the above-described data relating to I/M readiness flags, MIL status, and current DTCs. These data packets are transmitted over conventional wireless network, such as Cingular's Mobitex network or Arch/Pagenet's Reflex network.

Figure 2:
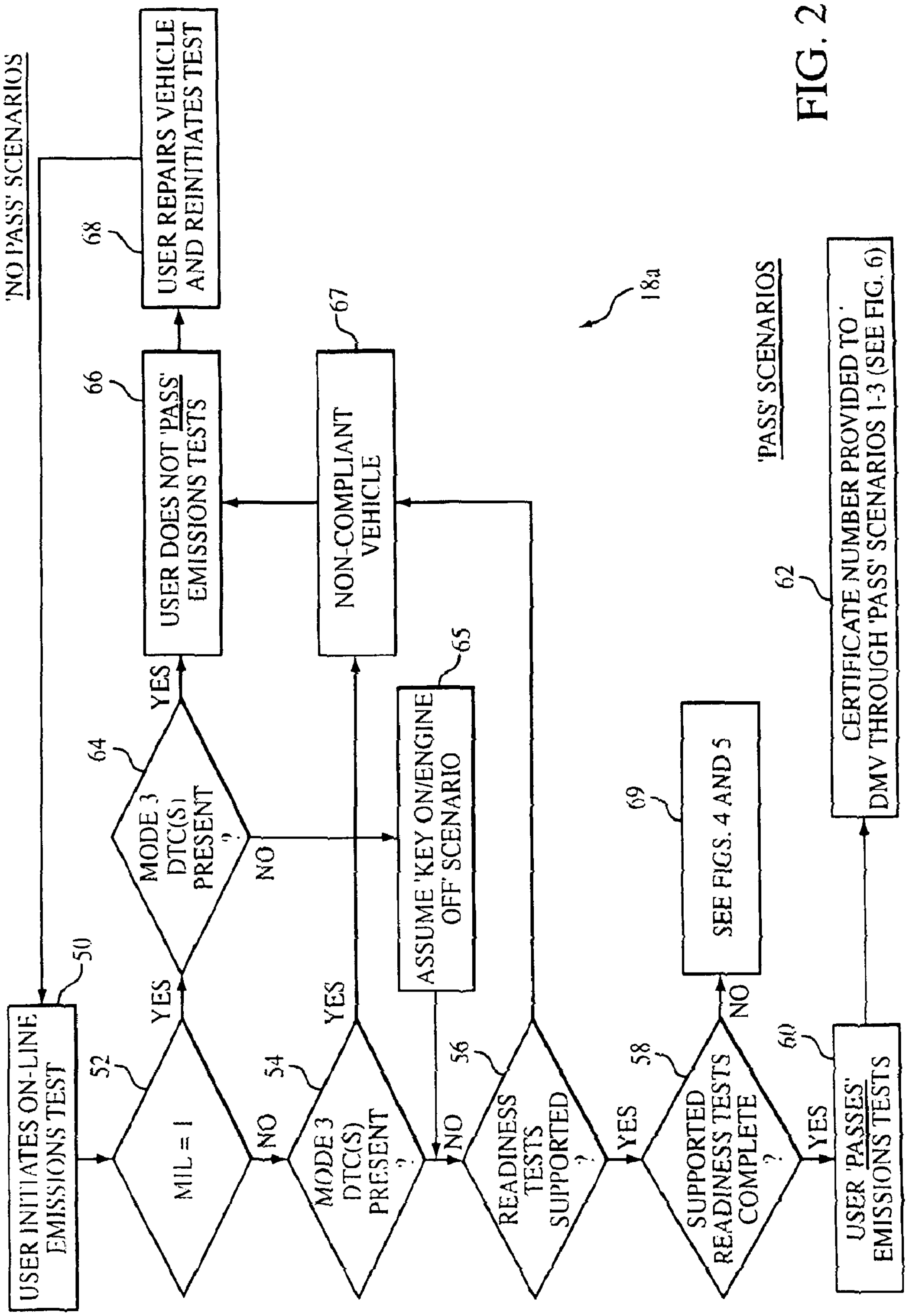
FIG. 2 is a flow chart describing a method used by the system of FIG. 1 to determine 'pass' and 'no pass' scenarios for the I/M-based emissions test.

FIG. 2 shows a flow chart 18*a* used by the data-processing component (18 in FIG. 1) to determine a vehicle's emissions performance by analyzing its I/M readiness flags, MIL status, and DTCs. The data-processing component 18*a* determines 'pass' and 'no pass' scenarios for the vehicle depending on these data. According to the flow chart 18*a* a user initiates an on-line emissions test (step 50) by, for example, clicking on a button on a website to initiate an algorithm that analyzes data included in the latest data packet. The algorithm first checks the status of the MIL (step 52). If the MIL is lit, the data packet includes a data field that typically has a value of '1'. If it is not lit, the value is typically '0'. If the MIL is not lit, the algorithm then checks if any mode 3 DTCs are present (step 54). Mode 3 DTCs are emissions-related an result in a lit MIL if present in most vehicles. The algorithm registers a 'null' value if no DTCs are present. Alternatively, the algorithm registers a 5-digit code (e.g., P0001) corresponding to each DTC if one or more DTCs are present. These codes, for example, can be stored in a database. Vehicles that feature mode 3 DTCs but have an unlit MIL are considered 'non-compliant' (step 67) and do not 'pass' the emissions test (step 66). In this case, the user is then instructed to repair the vehicle (step 68) to clear the DTC, and then reinitiate the emissions test.

If the MIL is not LIT (step 52) and no DTCs are present (step 54), the algorithm then checks a status of the vehicle's I/M readiness flags. This part of the algorithm involves determining which particular readiness flags are supported (step 56), and whether on not these flags are complete (step 58). If no readiness tests are supported (step 56) the vehicle is considered to be non-compliant (step 67) and 'fails' the emissions test as described above.

FIG. 3 shows a table 30 that describes the I/M readiness flags in more detail. The table 30 includes: a first column 32 that includes a time/date stamp describing when the I/M readiness flags were received by the host computer system (5 in FIG. 1); a second column 34 that lists the I/M readiness tests supported by the vehicle being tested; and a third column 36 that lists a status of the I/M readiness test (i.e., the 'flag') listed in the second column 34. For example, for the data shown in FIG. 3, the supported tests monitor the vehicle's misfiring, fuel systems, comprehensive components, catalyst, evaporative system, oxygen sensors, oxygen sensor heaters, and EGR systems. The third column 36 shows that the test for each one of these systems is 'complete'. The exact algorithm of the test is carried out by the vehicle's ECU and is specified by OBD regulations. These regulations are described in the OBD II regulations, section 1968.1 of Title 13, California Code of Regulations (CCR), adopted Sep. 25, 1997, the contents of which are incorporated herein by reference.

Referring again to FIG. 2, the algorithm checks whether or not the supported readiness flags are complete (step 58), and if so (as shown in Table 30 in FIG. 3), the user 'passes' the emissions test (step 60). A certificate indicating a 'pass' result is then provided to a Department of Motor Vehicles (DMV) or alternative certification organization through 1 of 3 mechanisms (step 62) described with reference to FIG. 6.

FIG. 2 also shows how the algorithm determines a 'no pass' result. In this case, the algorithm checks to see if the MIL is lit (step 52) by validating that the corresponding data has a value of '1'. If so, the algorithm checks to see if mode 3 DTCs are present (step 64). The combination of a lit MIL and at least one mode 3 DTC indicates that the user does not 'pass' the emissions test (step 66). The algorithm then instructs the user to repair the vehicle and reinitiate the test (step 68).

When the algorithm determines that the MIL is not lit (step 52) but one or more mode 3 DTCs are present (step 54), the algorithm assumes that the vehicle is non-compliant (step 67) and proceeds to determine that it 'fails' the emission test (step 66) and that the user repairs the vehicle and reinitiate the test (step 68). It should be noted that this component of the algorithm differs from that specified in the 40 CFR Parts 51 and 85, which specify that the MIL must be lit by a DTC for a user to fail the test.

Some vehicles (e.g., Porches manufactured after model year 1996) can have the unusual situation wherein during a 'key on/engine off' scenario the MIL is effectively on (i.e., it has a value of '1') (step 52), but no DTCs are present (step 64). In this case the vehicle is functioning properly and should not fail the emissions test. The algorithm accounts for this by assuming a 'key on/engine off' scenario (step 65) and then proceeds to check the supported readiness flags (step 56) as described above.

Figure 4:
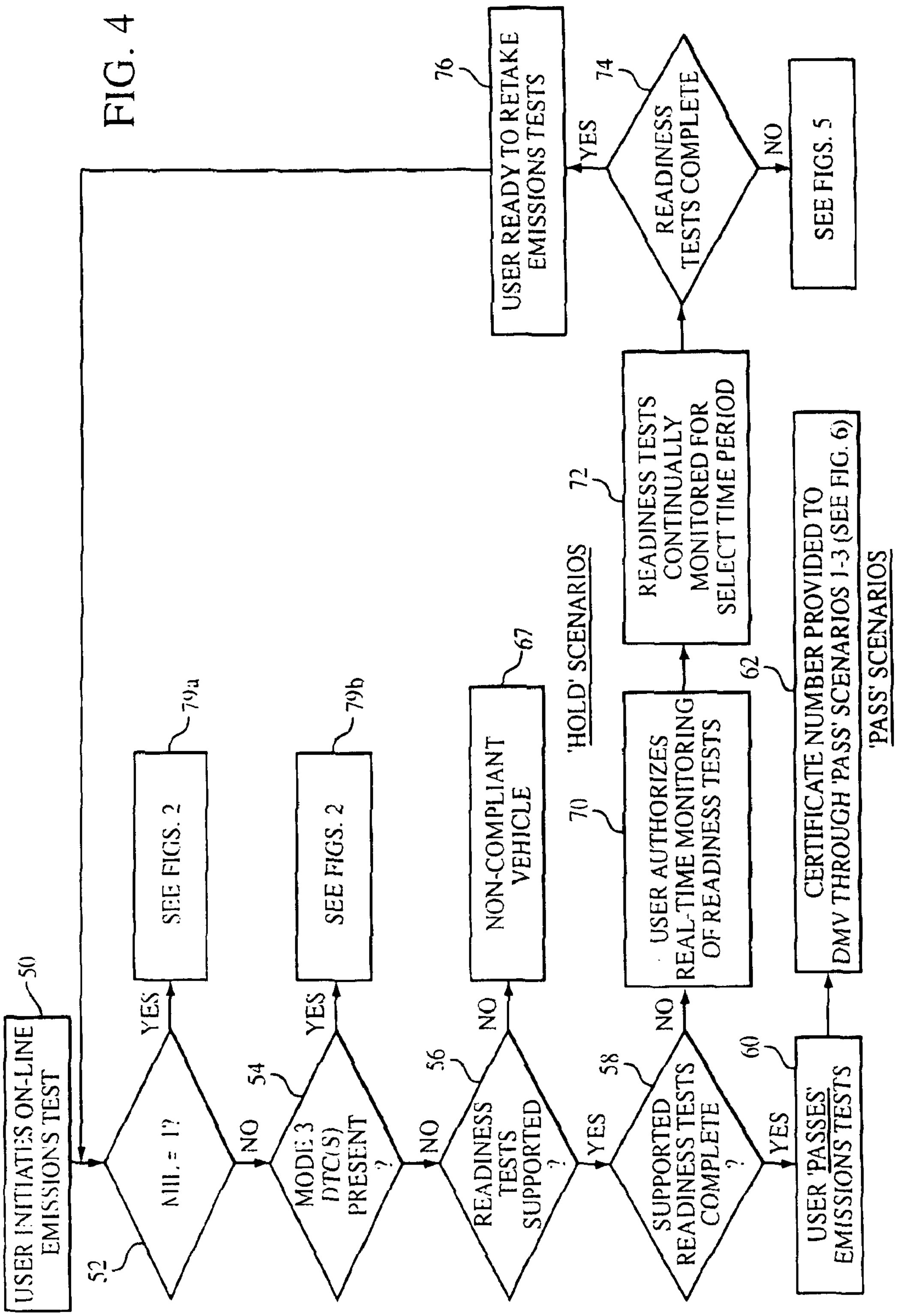
FIG. 4 is a flow chart describing a method used by the system of FIG. 1 to determine 'pass' and 'hold' scenarios for the I/M-based emissions test.
Figure 5:
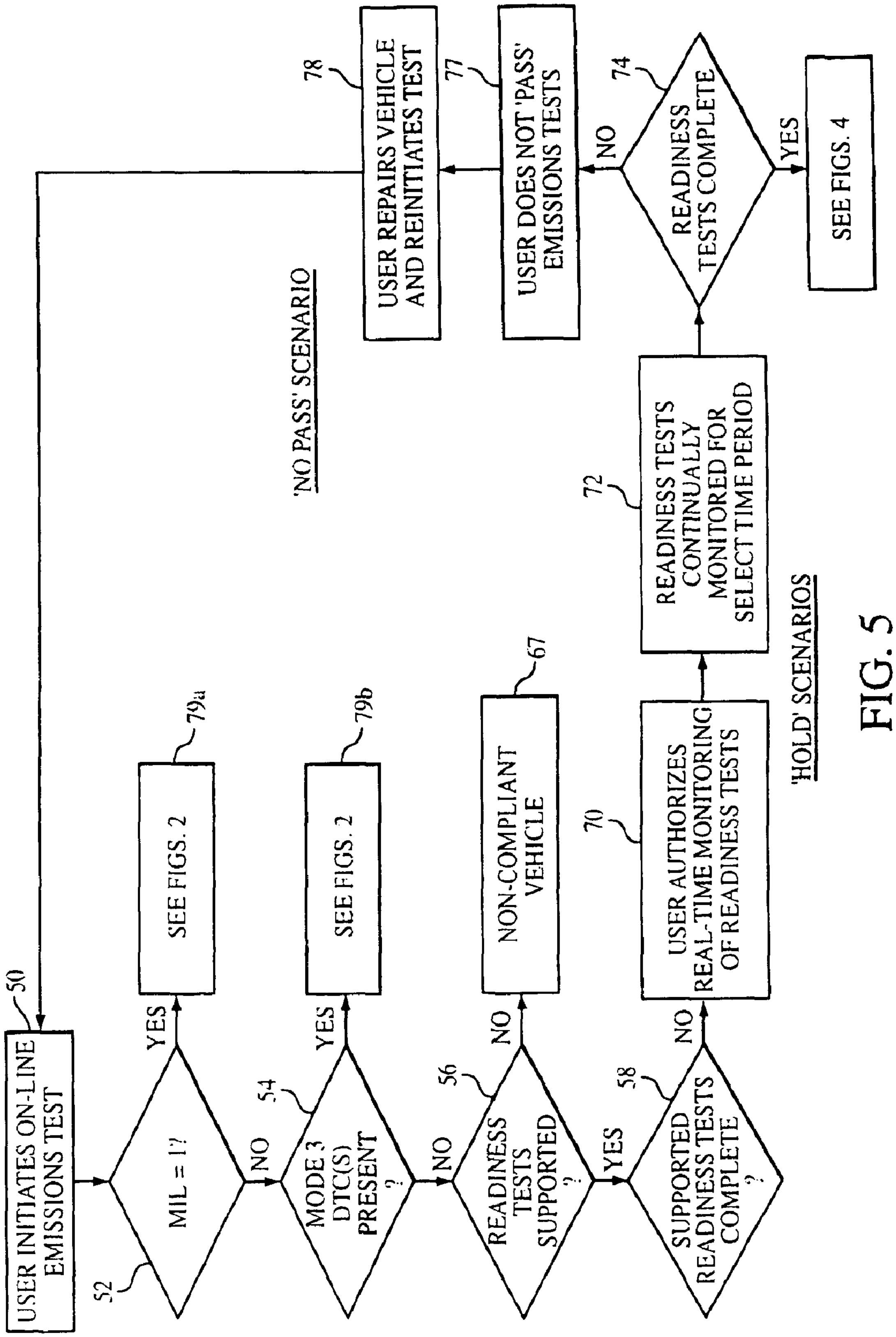
FIG. 5 is a flow chart describing a method used by the system of FIG. 1 to determine 'no pass' and 'hold' scenarios for the I/M-based emissions test.

FIGS. 4 and 5 describe algorithms resulting in a 'hold' scenario that eventually leads to either a 'pass' (FIG. 4) or a 'no pass' result (FIG. 5). In both cases, the system described above can continuously monitor a vehicle that does not 'pass' the emissions test. The system then informs the user at the exact moment that the vehicle does, in fact, 'pass' the test. The 'hold' scenario results when the algorithm determines that the MIL is not lit (step 52) and no DTCs are present (step 54), but the I/M readiness tests determined to be supported (step 56) have not yet registered 'complete' flags (step 58). This scenario is considered a 'hold'. FIG. 4, for example, indicates that in the case of a 'hold' scenario the user authorizes that the system monitor in real-time the status of the vehicle's I/M readiness tests (step 70). The user authorizes the real-time monitoring, for example, by clicking on a button a web page that starts this process. This could also be automatically done once the 'hold' scenario is entered. The system then continually monitors the status of the vehicle's I/M readiness flags for a selected time period (step 72). This time period must be adequate for a vehicle to complete a normal 'drive cycle', which is vehicle-dependent and is typically accomplished in less than a few days of normal driving. The user effectively 'passes' the emissions test (step 76) if, at the end of the time period, the algorithm determines that all supported readiness tests are completed (step 74). The effective 'pass' (step 76) means that the user automatically retakes the emissions test as described above. Once the user passes all the required steps (step 60), the algorithm provides a certificate indicating a 'pass' result (step 62) through one of the three scenarios as described with reference to FIG. 6.

FIG. 5 shows how analysis of I/M readiness flags can result first in a 'hold' scenario and then in a 'no pass' scenario. In this case the algorithm analyzes the MIL status (step 52), DTCs (step 54), and supported I/M readiness flags (step 56) in the exact manner as described with reference to FIG. 4. Also as in FIG. 4, the algorithm indicates that all I/M readiness tests are not complete (step 58) and, in response, the user authorizes real-time, continuous monitoring of these tests (step 70). Once authorized, the system continually monitors the status of the vehicle's I/M readiness flags for a selected time period (step 72) that is long enough for the vehicle to complete the normal 'drive cycle' described above. FIG. 5 shows that during this drive cycle the algorithm determines that all the I/M readiness tests are not complete (step 74), i.e. at least one of the flags registers as 'incomplete'. Note that as described above, vehicles manufactured between model year 1996–2000 can register 2 'incomplete' flags and still 'pass' the emissions test, while vehicles manufactured in model year 2000 can register one flag and still 'pass' the test. The algorithm can be modified to account for this.

In this case the algorithm registers a 'no pass' for the vehicle (step 77) and the user must repair the vehicle and reinitiate the emissions test (step 78) at a later time. No certificate is issued to the DMV following the 'no pass' result.

Figure 6:
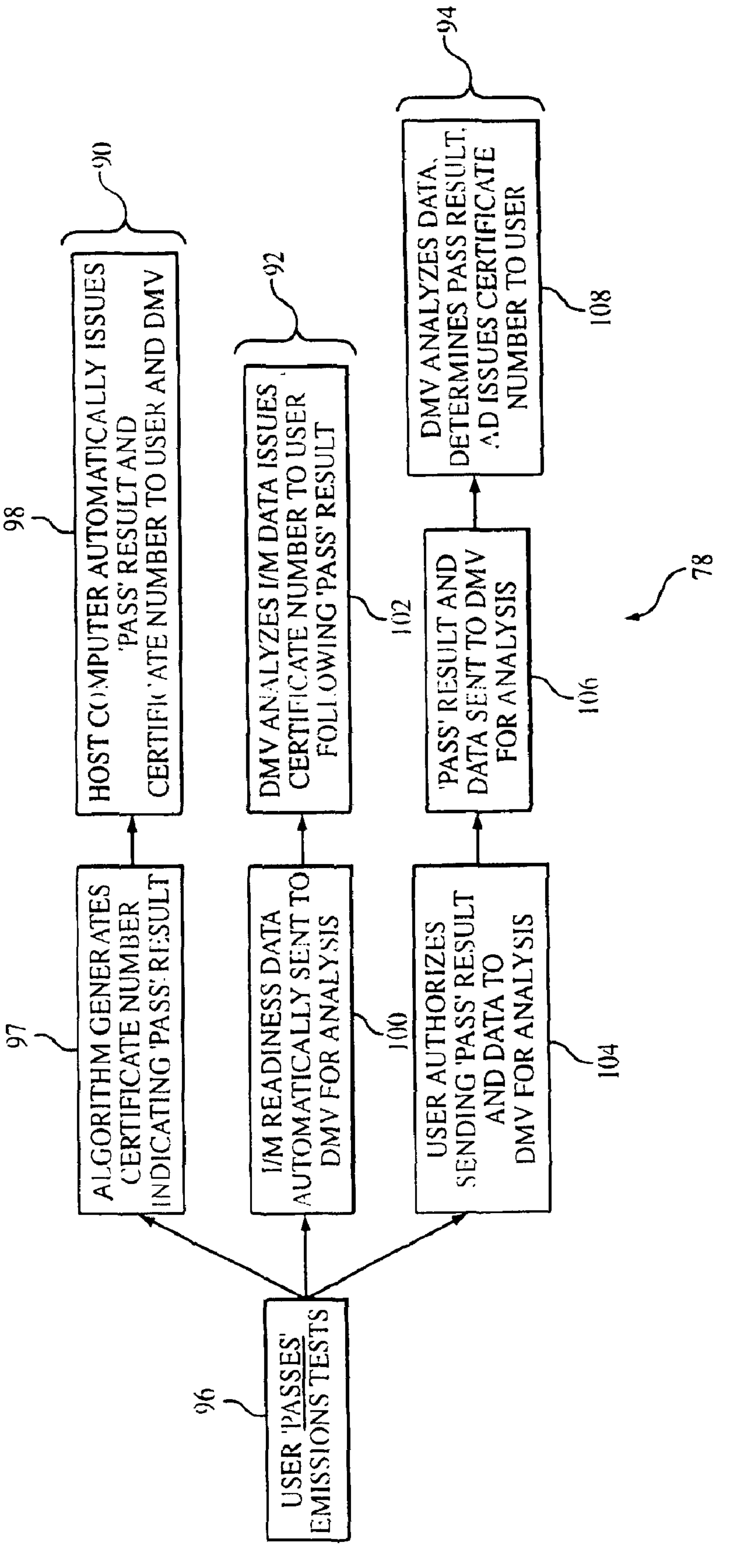
FIG. 6 is a flow chart describing three methods used by the system of FIG. 1 for sending data to a department of motor vehicles following a 'pass' scenario for the I/M-based emissions test.

FIG. 6 shows a flow chart indicating three separate methods 90, 92, 94 wherein data generated by the above-described algorithms are sent to the DMV for further processing (step 62 in FIGS. 2 and 4). In the first method 90 the user 'passes' the emissions test (step 96) as described with reference to FIGS. 2 and 4. The above-described algorithm then automatically generates a certificate number associated with the tested vehicle (step 97) that indicates the pass result. The host computer system then automatically issues the 'pass' result and the certificate number to the user and DMV (step 98). This can be done, for example, through email, posting the result on the website, or by directly transferring the result into a database at the DMV.

In an alternative method 92 the algorithm forgoes any processing as described above and instead sends the I/M readiness data, MIL status, and DTCs to the DMV for analysis (step 100). The DMV then attends to analyzing these data to determine if the user 'passes' the emissions test, and if so issues a certificate number to the user indicating the pass (step 102). The 'pass' result is then stored in the DMV's database. The third method 94 is similar to the first method 92, only in this case a user takes and passes the emissions test as described above, and then authorizes that the data (i.e., DTCs, MIL status, and completed I/M readiness tests) and the resulting 'pass' result be sent to the DMV for additional processing (step 104). These data are then sent to the DMV for analysis (step 106). In response, the DMV analyzes the data, determines a 'pass' result, and issues a certificate to the user (step 108).

FIG. 7 features a series of tables 150, 152, 154, 156, 158, 160, 162 that show how readiness flags associated with the eight I/M readiness tests described above evolve over time once a user generates and then clears a DTC. The first table 150 shows a vehicle operating with all tests having 'complete' flags (state 'A'). At a later time (Mar. 18, 2001-12:25) a DTC is then generated and cleared using, e.g., a scan tool. Immediately after clearing a second table 152 shows all tests have 'incomplete' flags (state 'B'). This state typically results when a DTC is cleared. A third table 154 indicates that the vehicle has driven 21 miles and that the catalyst monitoring and evaporative system monitoring tests are still 'incomplete', but that all other tests are complete (state 'C'). After the vehicle drives 32 more miles, a fourth table 156 indicates that all tests except the catalyst-monitoring test are complete (state 'D'). As shown in tables 156, 158, 160, the vehicle stays in state 'D' with an incomplete catalyst-monitoring test until the vehicle drives 244 miles relative to the start of the testing. At this point, as shown in table 162, all I/M readiness tests are complete and the vehicle returns to state 'A'.

Figure 8:
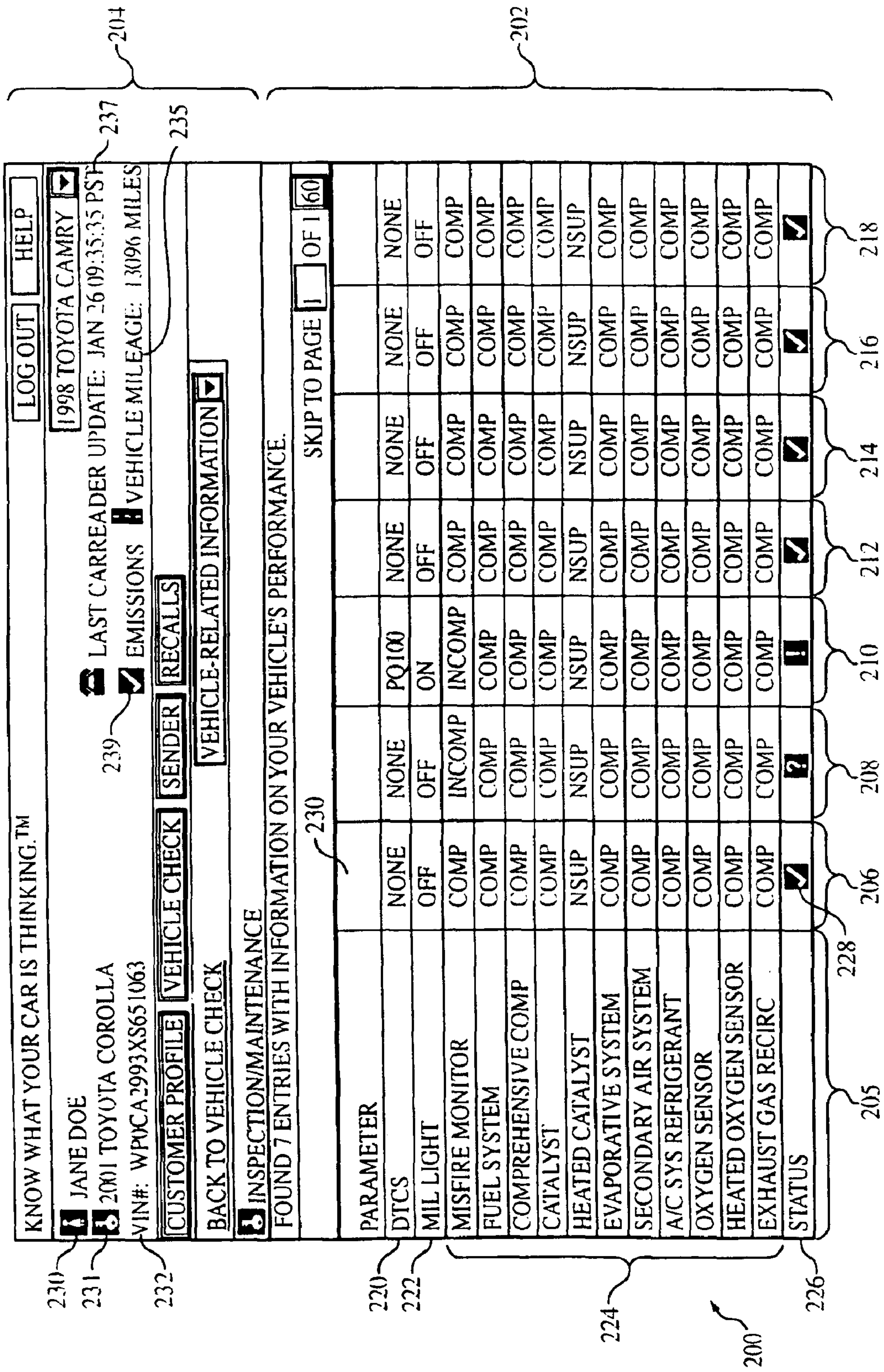
FIG. 8 is a screen capture of a web page from a web site of FIG. 1 that shows results from a series of I/M-based emissions tests conducted on a single vehicle over time.

FIG. 8 shows a web page 200 that displays the I/M readiness tests as described above. The web page 200 includes a header section 204 that describes the vehicle being tested, and a test section 202 that lists all the I/M readiness data. The test section 202 includes a parameter column 205 that lists the name of the parameter being monitored for the I/M-based emissions test. The parameter column 205 includes fields for DTCs 220, MIL status 222, flags for each of the I/M readiness tests 224, and the status 226 of the I/M-based readiness test. The status field 226 uses an icon 228 that indicates the result of the I/M-based emissions test. The algorithm that generates this result is the same as that described with references to FIGS. 2, 4, and 5; the data shown are more a model year 2001 Toyota Corolla (see the header's year/make/model field 231), and thus a single 'incomplete' readiness flag results in a 'hold' scenario. A green checkbox icon in the status field 226 indicates a 'pass' result, while a red exclamation point icon indicates a 'no pass' result and a yellow question mark icon indicates a 'hold' result.

Adjacent to the parameter column 205 are a series of individual columns 206, 208, 210, 212, 214, 216, 218, each of which corresponds to a particular time/date stamp that describes when the message was sent by the wireless appliance. For example, the first column 206 adjacent to the parameter column 205 includes a time/date stamp 230 of "Mar. 15, 2001 17:53:05". The data packet that was sent by the wireless appliance at this time indicates that the vehicle has no DTCs, an unlit MIL, and all 8 I/M readiness tests show 'complete' flags. According to the algorithm described above, this results in a 'pass' for the time/date stamp of Mar. 15, 2001 17:53:05. In this case a green icon 228 appears in the status field 226 to indicate the 'pass' result. As described above, this indicates that the vehicle 'passes' the emissions test and the result is sent to the DMV using one of the three methods described above with reference to FIG. 6. Conversely, for the column 210 that has a time/date stamp of 'Mar. 15, 2001 16:29:27', a single DTC (P0100) is present, resulting in a MIL status of 'on'. The algorithm described generates a 'no pass' result when the MIL is lit, and thus a red icon appears in the status field 226 and the user does not 'pass' the emissions test. No result is sent to the DMV in this case, and with a separate page the web site indicates that the user repair the vehicle and repeat the test. The column 208 has a time/date stamp of 'Mar. 15, 2001 16:53:05' and shows that no DTCs are present and the MIL is not lit. But in this case the misfire monitor I/M readiness test has an 'incomplete' flag, and thus the result of the test is 'hold' and a yellow icon appears in the status field 226. In this case, using a separate web page, the user had authorized that the vehicle be continually monitored to determine when and if the I/M readiness tests are complete. As shown by the column 206, all these tests did in fact complete with a time/date stamp of Mar. 15, 2001 17:53:05, and thus a 'pass' result was registered.

The header section 204 of the web page 200 displays information relating to the vehicle undergoing the emissions test. This section includes, for example, fields for the vehicle's owner 230, its year/make/model 231 and vehicle identification number (VIN) 232. The VIN is a unique 17-digit vehicle identification number that functions effectively as the vehicle's serial number. The header section also includes fields for the vehicle's mileage 235, the last time a data packet was received 237, and an icon 239 that indicates the current status of the vehicle's emissions test. The icon is a green checkmark since the latest emissions test (shown in the column 206) gave a 'pass' result.

Other embodiments are also within the scope of the invention. In particular, the web pages used to display the data can take many different forms, as can the manner in which the data are displayed. Web pages are typically written in a computer language such as 'HTML' (hypertext mark-up language), and may also contain computer code written in languages such as java for performing certain functions (e.g., sorting of names). The web pages are also associated with database software, e.g. an Oracle-based system, that is used to store and access data. Equivalent versions of these computer languages and software can also be used.

Different web pages may be designed and accessed depending on the end-user. As described above, individual users have access to web pages that only show data for the particular vehicle, while organizations that support a large number of vehicles (e.g. automotive dealerships, the EPA, California Air Resources Board, or an emissions-testing organization) have access to web pages that contain data from a collection of vehicles. These data, for example, can be sorted and analyzed depending on vehicle make, model, odometer reading, and geographic location. The graphical content and functionality of the web pages may vary substantially from what is shown in the above-described figures. In addition, web pages may also be formatted using standard wireless access protocols (WAP) so that they can be accessed using wireless devices such as cellular telephones, personal digital assistants (PDAs), and related devices.

The web pages also support a wide range of algorithms that can be used to analyze data once it is extracted from the data packets. For example, the above-mentioned I/M-based emissions test relies on current DTCs, MIL status, and the results of an I/M readiness test. This algorithm can have different embodiments. For example, as described above, a vehicle can register a 'no pass' if both the MIL is lit (i.e., MIL=1) and a DTC is present. This is the algorithm suggested by the EPA. As described above, in order to effectively analyze non-compliant vehicles, the algorithms also registers a 'no pass' if a DTC is present but the NIL is not lit. Other embodiments are also possible. In addition, other algorithms for analyzing these or other data can also be used. Such an algorithm is defined in the application entitled "WIRELESS DIAGNOSTIC SYSTEM FOR CHARACTERIZING A VEHICLE'S EXHAUST EMISSIONS", U.S. Ser. No. 09/776,033, filed Feb. 1, 2001, the contents of which are incorporated herein by reference.

The emissions test above only shows results for a single vehicle. But the system is designed to test multiple vehicles and multiple secondary computer systems, each connected to the web site through the Internet. Similarly, the host computer system used to host the website may include computers in different areas, i.e. the computers may be deployed in separate data centers resident in different geographical locations.

The emissions test described above is performed once authorized by a user of the system. Alternatively, the test could be performed when a data parameter (e.g. engine coolant temperature) exceeded a predetermined value. Or a third party, such as the EPA, could initiate the test. In some cases, multiple parameters (e.g., engine speed and load) can be analyzed to determine when to initiate a test. Or the test can simply be constantly active, and can be used to notify a user at the exact moment when his vehicle's would fail to 'pass' the emissions test.

In general, the test could be performed after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize emission performance in specific geographic locations, or to characterize traffic.

In other embodiments, additional hardware can be added to the in-vehicle wireless appliance to increase the number of parameters in the transmitted data. For example, hardware for global-positioning systems (GPS) may be added so that the location of the vehicle can be monitored along with its data. Or the radio modem used to transmit the data may employ a terrestrial GPS system, such as that available on modems designed by Qualcomm, Inc. In still other embodiments, the location of the base station that transmits the message can be analyzed to determine the vehicle's approximate location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system.

In other embodiments, the antenna used to transmit the data packet is embedded in the wireless appliance, rather than being disposed in the vehicle's shade band.

In still other embodiments, data processed using the above-described systems can be used for: remote billing/payment of tolls; remote payment of parking/valet services; remote control of the vehicle (e.g., in response to theft or traffic/registration violations); and general survey information.

Still other embodiments are within the scope of the following claims.

What is claimed is:

1. A method for characterizing a vehicle's emissions comprising the steps of:

generating information from the vehicle that comprises a diagnostic trouble code, and status of a MIL,;

receiving the information with a wireless appliance comprising a wireless transmitter;

transmitting the information or a version thereof with the wireless transmitter over an airlink to a host computer system;

analyzing the information or a version thereof with the host computer system to determine a status of the vehicle's emissions;

repeating the generating, receiving, transmitting, and analyzing steps while the vehicle is in use to determine an updated status of the vehicle's emissions; and automatically sending a communication describing the vehicle's emissions status.

2. The method of claim 1, wherein the repeating step further comprises repeating the generating, receiving, transmitting, and analyzing steps to determine when the vehicle's emissions are no longer compliant with a predetermined emissions-related criterion.

3. The method of claim 2, wherein the sending step further comprises sending out a communication indicating that the vehicle's emissions are no longer compliant with the predetermined emissions-related criterion.

4. The method of claim 1, wherein the repeating step further comprises repeating the generating, receiving, transmitting, and analyzing steps to determine that the vehicle's emissions are compliant with a pre-determined emissions-related criterion.

5. The method of claim 1, wherein the repeating step further comprises repeating the generating, receiving, transmitting, and analyzing steps to monitor data relating to at least one I/M readiness flag.

6. The method of claim 5, wherein the sending step further comprises sending out a communication indicating a status of at least one I/M readiness flag.

7. The method of claim 5, wherein the step of repeating the generating, receiving, transmitting, and analyzing steps to monitor information describing at least one I/M readiness flag is stopped when all readiness flags are registered as 'complete' or an equivalent thereof.

8. The method of claim 5, wherein the sending step further comprises sending out a communication indicating a description of at least one DTC.

9. The method of claim 1, wherein the sending step further comprises using a computer to send out an email or make a phone call.

10. The method of claim 9, wherein the computer is comprised by the host computer system.

11. The method of claim 1, further comprising the step of processing the information with the host computer system to retrieve a data set or a version thereof.

12. The method of claim 11, wherein the data set or portions thereof are stored in a database comprised by the host computer system.

13. The method of claim 1, wherein information from the vehicle also comprises data describing at least one I/M readiness flag and the analysis step further includes the following steps:

a) determining if one or more DTCs are present in the information;

b) determining a status of the MIL in the information; and c) determining a status of the I/M readiness tests in the information.

14. The method of claim 13, wherein the analysis step further includes the step of determining if a user 'passes' or 'does not pass' an emissions test.

15. The method of claim 14, wherein the data relating to the at least one I/M readiness flag describes the status of the flag.

16. The method of claim 15, wherein the generating step further includes generating a status of at least one of the following I/M readiness tests: i) misfire monitoring; ii) fuel systems monitoring; iii) comprehensive component monitoring; iv) catalyst monitoring; v) evaporative system monitoring; vi) oxygen sensor monitoring; vii) oxygen sensor heater monitoring; viii) exhaust gas recirculator system monitoring.

17. The method of claim 16, wherein the generating step further includes generating a status of each of tests i)–viii) that are supported by the vehicle.

18. The method of claim 17, wherein the analysis step further includes determining if the I/M readiness flags are characterized by at least one of the following: 'complete', 'incomplete', 'not available', 'not supported' or equivalents thereof.

19. The method of claim 18, wherein the vehicle is determined to not 'pass' an emissions test if more than 2 of the I/M readiness flags are 'incomplete'.

20. The method of claim 13, wherein the vehicle is determined to not 'pass' an emissions test if at least one DTC is present in the data.

21. The method of claim 13, wherein the analysis step determines that a user does not 'pass' an emissions test if the MIL status is 'on' or an equivalent thereof.

22. The method of claim 13, wherein the vehicle is determined to 'pass' an emissions test if no DTCs are present in the data.

23. The method of claim 22, wherein the analysis step determines that a user 'passes' an emissions test if the MIL status is 'off' or an equivalent thereof and all supported I/M readiness flags are complete or an equivalent thereof.

24. The method of claim 13, wherein the analysis step determines that a user does not 'pass' an emissions test if the MIL status is 'off' or an equivalent thereof and all supported I/M readiness flags are not complete or an equivalent thereof.

25. The method of claim 13, wherein the analysis step determines that a user 'passes' an emissions test if the MIL status is 'off' or an equivalent thereof and no more than two of the supported I/M readiness flags are 'incomplete' or an equivalent thereof.

26. The method of claim 25, wherein the analysis step determines that a user 'passes' an emissions test if the MIL status is 'off', or an equivalent thereof, the vehicle has no DTCs, and all supported I/M readiness flags are 'complete' or an equivalent thereof.

27. The method of claim 1, wherein results of the analysis step are stored in a database.

28. The method of claim 1, wherein results of the analysis step are emailed.

29. The method of claim 1, further including the step of displaying the information on a web site.

30. The method of claim 29, wherein the web site is hosted by a host computer system.

31. The method of claim 1, further including the step of displaying results of the emissions test on the web site.

32. The method of claim 31, further including the step of emailing the results of the emissions test.

33. The method of claim 1, wherein the generating step further includes the step of monitoring an engine computer in the vehicle to generate the information that includes a diagnostic trouble code, and status of a MIL.

34. The method of claim 33, wherein the engine computer is monitored with a period of 24 hours or less.

35. The method of claim 33, wherein information from the vehicle also comprises data describing I/M readiness flags and wherein the monitoring ceases when the data relating to the I/M readiness flags indicates that no more than two flags supported in the vehicle are 'incomplete' or an equivalent thereof.

36. The method of claim 35, wherein the monitoring ceases when the data relating to the I/M readiness flags indicates that each flag supported in the vehicle is 'complete' or an equivalent thereof.

37. The method of claim 1, wherein the receiving step further includes serially transferring the information through an OBD-II connector or equivalent thereof in the vehicle to the wireless appliance.

38. The method of claim 1, further comprising sending at least one of an electronic text, data, and voice message to a computer, cellular telephone, or wireless device.

39. The method of claim 38, wherein at least one of electronic text, data, and voice message describes a status of the vehicle's emissions.

40. A method for characterizing a vehicle's emissions comprising the steps of:

generating information from the vehicle that includes a diagnostic trouble code and status of a MIL;

transferring the information to a wireless appliance comprising a wireless transmitter;

transmitting the information or a version thereof with the wireless transmitter over an airlink to a wireless communications system and then to a host computer system;

analyzing the information or a version thereof with the host computer system;

repeating the generating, transferring, transmitting, and analyzing steps while the vehicle is in use to determine an updated status of the vehicle's emissions; and automatically notifying a user associated with the vehicle of the vehicle's emissions performance.

41. The method of claim 40, wherein the analysis step further includes the steps of determining if the vehicle is in compliance with a predetermined standard relating to emissions.

42. The method of claim 40, wherein the notifying step further includes sending an email to the user.

43. The method of claim 42, wherein the email comprises the results of the analyses step.

44. The method of claim 40, wherein the notifying step further includes the step of notifying the user that the vehicle does not pass an emissions test.

* * * * *